United States Patent [19]
DeNicola, Jr. et al.

[11] Patent Number: 6,140,425
[45] Date of Patent: *Oct. 31, 2000

[54] PROCESS FOR MAKING POLYPROPYLENE GRAFT COPOLYMERS CONTAINING ANHYDRIDE GROUPS

[75] Inventors: Anthony J. DeNicola, Jr., Newark; Abuzar Syed, Bear, both of Del.

[73] Assignee: Montell North America Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/918,936

[22] Filed: Aug. 25, 1997

[51] Int. Cl.[7] .......................... C08F 255/00; C08F 255/04
[52] U.S. Cl. .......................... 525/293; 525/301; 525/302; 525/303; 525/307; 525/309; 525/320
[58] Field of Search ..................................... 525/301, 293, 525/302, 303, 307, 309, 320

[56] References Cited

U.S. PATENT DOCUMENTS

| | | | |
|---|---|---|---|
| 4,727,117 | 2/1988 | Hallden-Abberton et al. | 525/343 |
| 4,742,123 | 5/1988 | Kopchik | 525/329.7 |
| 5,140,074 | 8/1992 | DeNicola, Jr. et al. | 525/263 |
| 5,401,784 | 3/1995 | Boillot et al. | 521/27 |
| 5,411,994 | 5/1995 | Galli et al. | 521/50.5 |
| 5,504,153 | 4/1996 | Amici et al. | 525/57 |

FOREIGN PATENT DOCUMENTS

| | | |
|---|---|---|
| 525710 | 2/1993 | European Pat. Off. . |
| 991572 | 5/1965 | United Kingdom . |

*Primary Examiner*—Jeffrey C. Mullis

[57] ABSTRACT

A graft copolymer containing anhydride groups is made by (1) making a graft copolymer comprising a backbone of a propylene polymer material having graft polymerized thereto polymerized monomers selected from the group consisting of (a) at least one acrylic acid substituted with a 1–3 C alkyl group and (b) a mixture of at least one of these substituted acrylic acids and a vinyl compound capable of copolymerizing therewith, wherein the total amount of polymerized monomers is about 20 parts to about 240 parts per hundred parts of the propylene polymer material and the amount of the substituted acrylic acid is 60 mole % or more of the polymerized monomers, and (2) heating the graft copolymer to a temperature of about 170° C. to about 300° C. to dehydrate the acid groups in the graft copolymer to form anhydride groups.

11 Claims, 4 Drawing Sheets

PROCESS FOR MAKING POLYPROPYLENE GRAFT COPOLYMERS CONTAINING ANHYDRIDE GROUPS

FIELD OF THE INVENTION

This invention relates to a process for making polypropylene graft copolymers having anhydride groups in the side chains.

BACKGROUND OF THE INVENTION

Acrylic and methacrylic acids are the simplest unsaturated organic acids. Due to the presence of unsaturated carbon-carbon double bonds, these acids readily react with electrophilic, free radical and nucleophilic agents. Free radical-initiated polymerization of the double bonds is the most common reaction. Minor amounts of the acids are normally used as comonomers to vary the mechanical properties of other polymers. Most of the acrylic and methacrylic acids are used in the form of their ethyl, methyl and butyl esters.

The polymerized acids themselves are brittle solids that cannot be molded and therefore their use is very limited. It is also known that these polyacids are easily dehydrated to form polyanhydrides. Generally, the glass transition temperature (Tg) of the dehydrated polyacids increases with an increase in anhydride concentration.

Although not of commercial importance, acrylic and methacrylic anhydrides can polymerize to form polyacrylic and polymethacrylic anhydrides. The mechanical properties of the polymerized polyacids and polymerized polyanhydrides have not been reported in the literature.

Grafting of vinyl monomers onto an olefin polymer backbone is disclosed in U.S. Pat. No. 5,140,074, where graft copolymers are made by contacting an olefin polymer with a free radical polymerization initiator, such as an organic peroxide, and a vinyl monomer in a nonoxidizing environment, deactivating residual free radicals, and decomposing unreacted initiator. Acrylic and methacrylic acids are described as suitable vinyl monomers. U.S. Pat. No. 5,411,994 discloses a process for making graft copolymers by irradiating an olefin polymer and then treating with a vinyl monomer in liquid form in a nonoxidizing environment, deactivating free radicals, and removing unreacted monomer.

It has been reported in the literature that incorporation of ionic moieties such as methacrylic acid into polystyrene raises the Tg significantly (~3° F./mole % of methacrylic acid). We have found an improvement in the heat resistance of polypropylene graft polymerized with styrene and methacrylic acid to form styrene/methacrylic acid copolymer side chains. However, when the methacrylic acid is incorporated into the polymer chain at levels up to 40 mole % there is a corresponding reduction in the ductility of the product as indicated by weldline strength, elongation, and difficulty in impact modification and extrusion There is no known process for making graft copolymers containing anhydride groups from a propylene polymer material having graft polymerized thereto acrylic acids substituted with 1–3 C alkyl groups. Thus, the effect such anhydride groups would have on the mechanical properties of the graft copolymer product is also unknown.

SUMMARY OF THE INVENTION

The process of this invention for making graft copolymers containing anhydride groups comprises:

(1) producing a graft copolymer comprising a backbone of a propylene polymer material having graft polymerized thereto polymerized monomers selected from the group consisting of:
 (a) at least one 1–3 C alkyl-substituted acrylic acid, and
 (b) a mixture of (a) with at least one vinyl monomer capable of copolymerizing therewith,
 wherein the total amount of polymerized monomers is about 20 parts to about 240 parts per hundred parts of the propylene polymer material and the amount of substituted acrylic acid is equal to or greater than 60 mole % of the polymerized monomers, and
(2) heating the resulting graft copolymer to a temperature of about 170° C. to about 300° C. to dehydrate the acid groups in the graft copolymer to form anhydride groups.

The graft copolymers of this invention exhibit a good balance of ductility (elongation to break), impact strength and weldline strength in the finished product, and can easily be impact-modified with a wide variety of rubber materials. Glass-reinforced graft copolymer compositions with a good balance of properties were also produced.

DETAILED DESCRIPTION OF THE INVENTION

Figure 1:
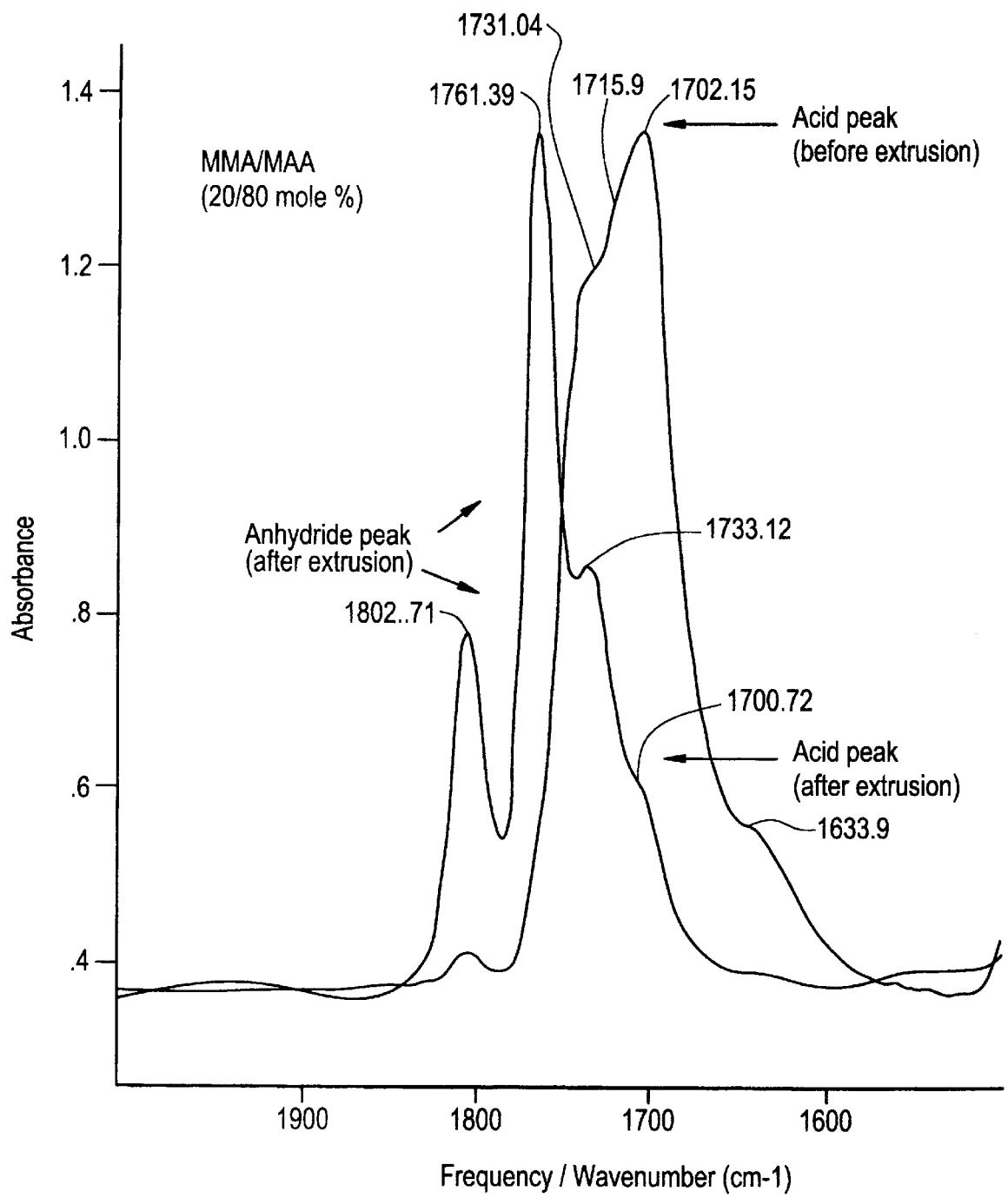
FIG. 1 shows the infrared (IR) spectra before and after extrusion for a graft copolymer comprising a propylene homopolymer backbone to which was grafted a copolymer comprising 20 mole % methyl methacrylate and 80 mole % methacrylic acid. The spectra were recorded using a Nicolet 60SX Fourier transform infrared (FTIR) spectrometer with an IR Plan microscope and a Nicolet 740SX FTIR.

The first step in the process of this invention is the preparation of a graft copolymer having a backbone of a propylene polymer material.

The propylene polymer material that is used as the backbone of the graft copolymer in the process of this invention can be:

(a) a crystalline homopolymer of propylene having an isotactic index greater than 80, preferably about 85 to about 99;
(b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, preferably about 4%, and when the olefin is a $C_4$–$C_{10}$ α-olefin, the maximum polymerized content thereof is 20%, preferably about 16%, by weight, the copolymer having an isotactic index greater than 85;

(c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:
  (i) about 10% to about 60% by weight, preferably about 15% to about 55%, of a crystalline propylene homopolymer having an isotactic index greater than 80, preferably about 85 to about 98, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, preferably about 90% to about 99%, and an isotactic index greater than 85;
  (ii) about 5% to about 25%, preferably about 5% to about 20%, of a copolymer of ethylene and propylene or a $C_4$–$C_8$ α-olefin that is insoluble in xylene at ambient temperature, and
  (iii) about 30% to about 70%, preferably about 20% to about 65%, of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene, and containing less than 70% by weight, preferably about 10% to about 60%, most preferably about 12% to about 55%, of ethylene and being soluble in xylene at ambient temperature, and having an intrinsic viscosity of about 1.5 to about 4.0 dl/g,
wherein the total amount of (ii) and (iii), based on the total olefin polymer composition, is about 50% to about 90%, the weight ratio of (ii)/(iii) is less than 0.4, preferably 0.1 to 0.3, and the composition is prepared by polymerization in at least two stages and has a flexural modulus of less than 150 MPa; or (e) a thermoplastic olefin comprising:
  (i) about 10% to about 60%, preferably about 20% to about 50%, of a crystalline propylene homopolymer having an isotactic index greater than 80, or a crystalline copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer having a propylene content greater than 85% and an isotactic index of greater than 85;
  (ii) about 20% to about 60%, preferably about 30% to about 50%, of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene and containing less than 70% ethylene and being soluble in xylene at ambient temperature; and
  (iii) about 3% to about 40%, preferably about 10% to about 20%, of a copolymer of ethylene and propylene or a $C_4$–$C_8$ α-olefin that is insoluble in xylene at ambient temperature,
wherein the composition has a flexural modulus of greater than 150 but less than 1200 MPa, preferably about 200 to about 1100 MPa, most preferably about 200 to about 1000 MPa.

Room or ambient temperature is ~25° C.

$C_4$–$C_8$ α-olefins useful in the preparation of (d) and (e) include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Propylene polymer materials (d) and (e) can be prepared by polymerization in at least two stages, where in the first stage the propylene; propylene and ethylene; propylene and an α-olefin, or propylene, ethylene and an α-olefin are polymerized to form component (i) of (d) or (e), and in the following stages the mixtures of ethylene and propylene; ethylene and the α-olefin, or ethylene, propylene and the α-olefin, and optionally a diene, are polymerized to form components (ii) and (iii) of (d) or (e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (d) is described in more detail in U.S. Pat. Nos. 5,212,246 and 5,409,992, which preparation is incorporated herein by reference. The preparation of propylene polymer material (e) is described in more detail in U.S. Pat. Nos. 5,302,454 and 5,409,992,. which preparation is incorporated herein by reference.

Propylene homopolymer is the preferred propylene polymer backbone material.

The monomers that form grafted polymers or copolymers containing anhydride groups on the backbone of the propylene polymer material are selected from the group consisting of (a) at least one 1–3 C alkyl-substituted acrylic acid, and (b) a mixture of (a) with at least one vinyl monomer capable of copolymerizing therewith.

The vinyl monomer can be any monomeric vinyl compound capable of being polymerized by free radicals, wherein the vinyl radical, $H_2C=CR-$, in which R is H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-t-butylstyrene, methylvinylpyridine, and ethylvinylpyridine; (2) vinyl esters of aromatic and saturated aliphatic carboxylic acids, including vinyl formate, vinyl acetate, vinyl chloroacetate, vinyl cyanoacetate, vinyl propionate, and vinyl benzoate; and (3) unsaturated aliphatic nitriles and carboxylic acid derivatives including acrylonitrile, methacrylonitrile, acrylamide, methacrylamide, acrylate esters, such as the methyl, ethyl, hydroxyethyl, 2-ethylhexyl, and butyl acrylate esters, and methacrylate esters such as the methyl, ethyl, butyl, benzyl, phenylethyl, phenoxyethyl, epoxypropyl, and hydroxypropyl methacrylate esters. Free radical polymerizable dienes, such as butadiene, isoprene and their derivatives, can also be used. Multiple monomers from the same or different classes can be employed. Styrene is the preferred vinyl monomer.

During the graft polymerization, the monomers also polymerize to form a certain amount of free or ungrafted polymer or copolymer. Any reference to "polymerized monomers" in this specification is meant to include both grafted and ungrafted polymerized monomers. The polymerized monomers comprise from about 20 parts to about 240 parts per hundred parts of the propylene polymer material, preferably about 30 to about 95 pph. The morphology of the graft copolymer is such that the propylene polymer material is the continuous or matrix phase, and the polymerized monomers, both grafted and ungrafted, are a dispersed phase. The amount of substituted acrylic acid is equal to or greater than 60 mole %, preferably greater than 80 mole %, of the polymerized monomers. When methacrylic acid is used as a monomer, it is most preferably 100% of the monomers.

The graft copolymer can be made according to any one of various methods. One of these methods involves forming active grafting sites on the propylene polymer material either in the presence of the grafting monomers, or followed by treatment with the monomers. The grafting sites can be produced by treatment with a peroxide or other chemical compound that is a free radical polymerization initiator, or by irradiation with high energy ionizing radiation. The free radicals produced in the polymer as a result of the chemical or irradiation treatment form the active grafting sites on the polymer and initiate the polymerization of the monomers at these sites. Graft copolymers produced by peroxide-initiated grafting methods are preferred.

Preparation of graft copolymers by contacting the propylene polymer with a free radical polymerization initiator such as an organic peroxide and a vinyl monomer is described in more detail in U.S. Pat. No. 5,140,074, which preparation is incorporated herein by reference. Preparation of graft copolymers by irradiating an olefin polymer and then treating with a vinyl monomer is described in more detail in U.S. Pat. No. 5,411,994, which preparation is incorporated herein by reference.

Figure 2:
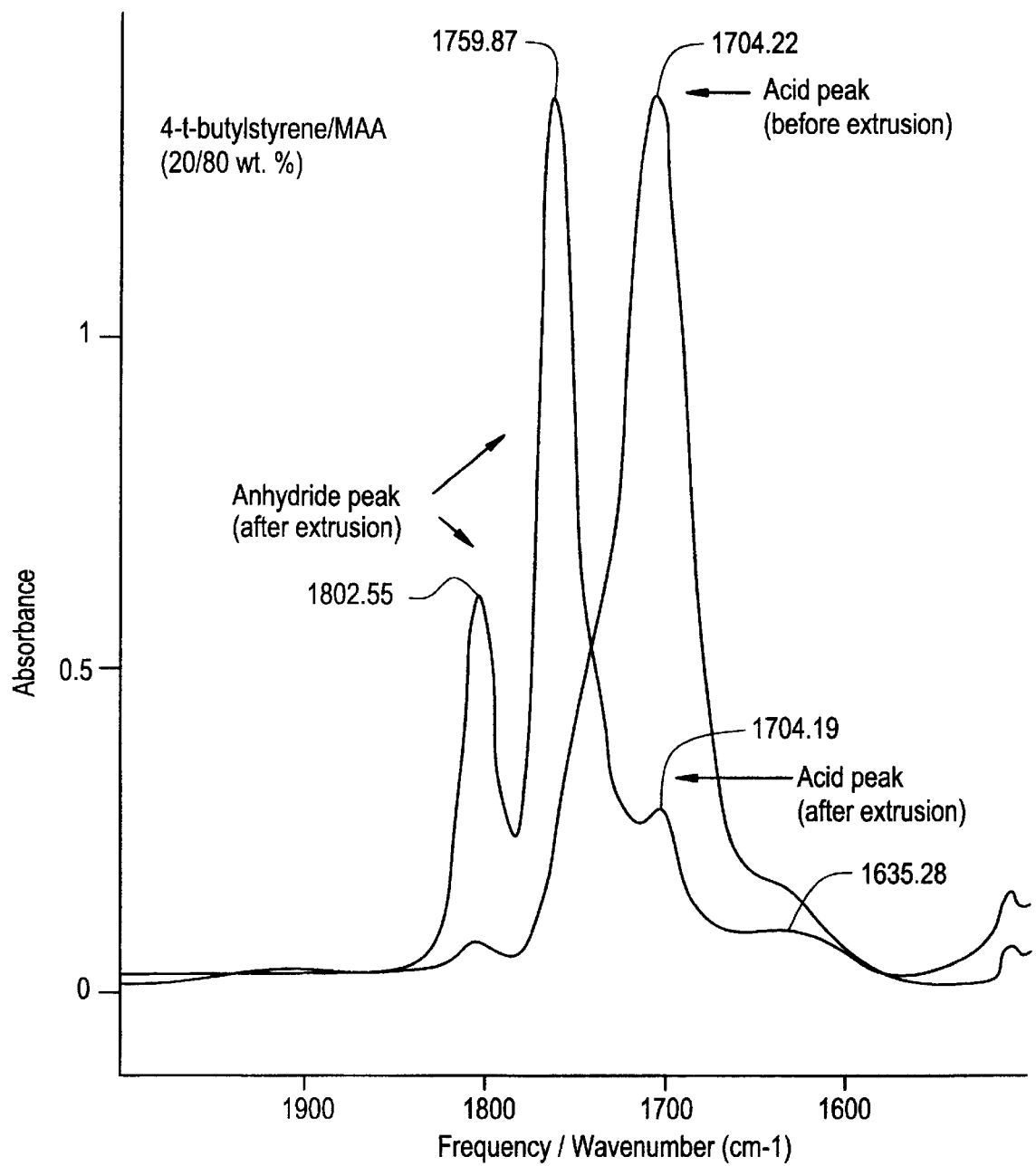
FIG. 2 shows the IR spectra before and after extrusion for a graft copolymer comprising a propylene homopolymer backbone to which was grafted a copolymer comprising 20 weight % 4-t-butylstyrene and 80 weight % methacrylic acid.
Figure 3:
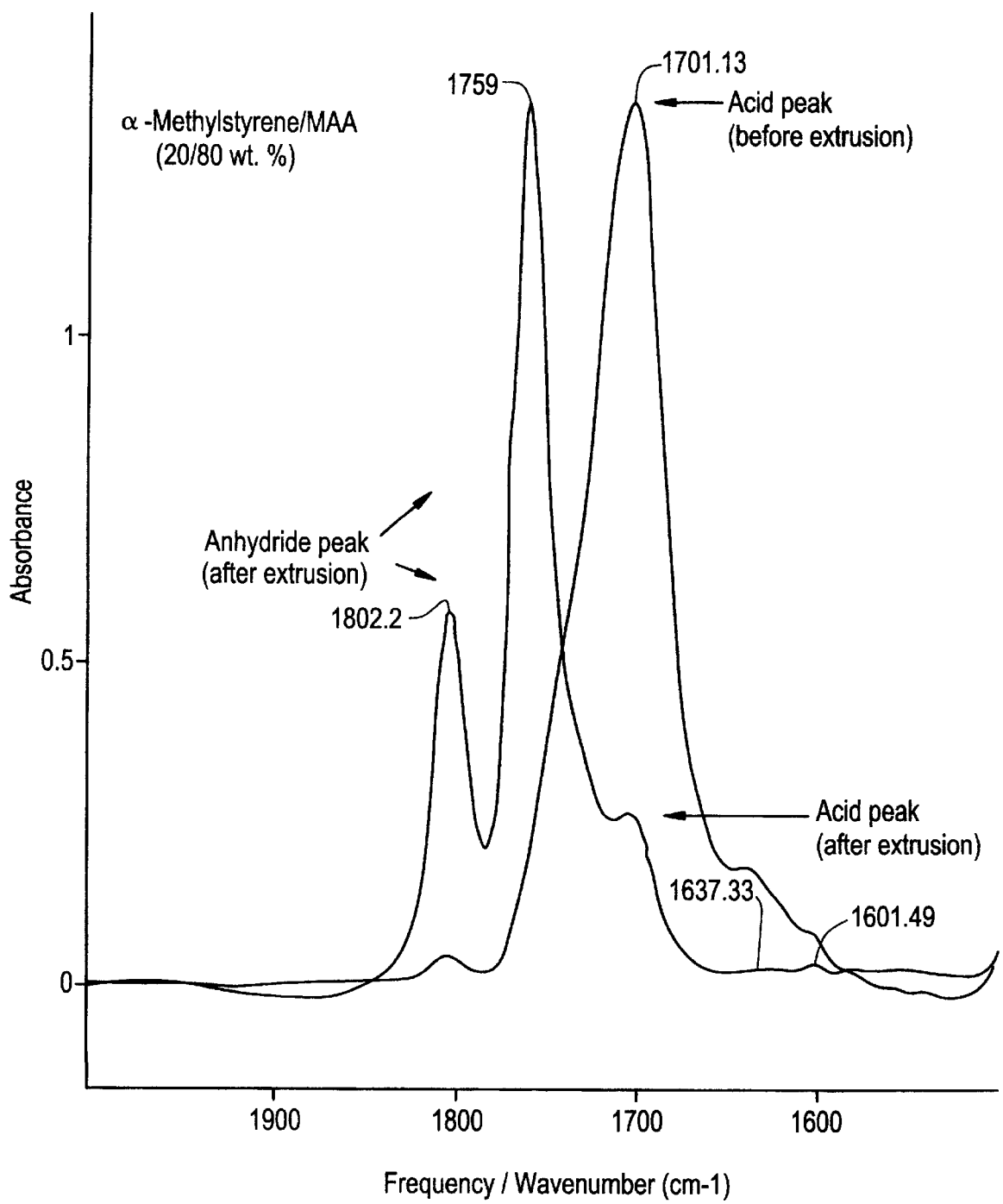
FIG. 3 shows the IR spectra before and after extrusion for a graft copolymer comprising a propylene homopolymer backbone to which was grafted a copolymer comprising 20 weight % a-methylstyrene and 80 weight % methacrylic acid.
Figure 4:
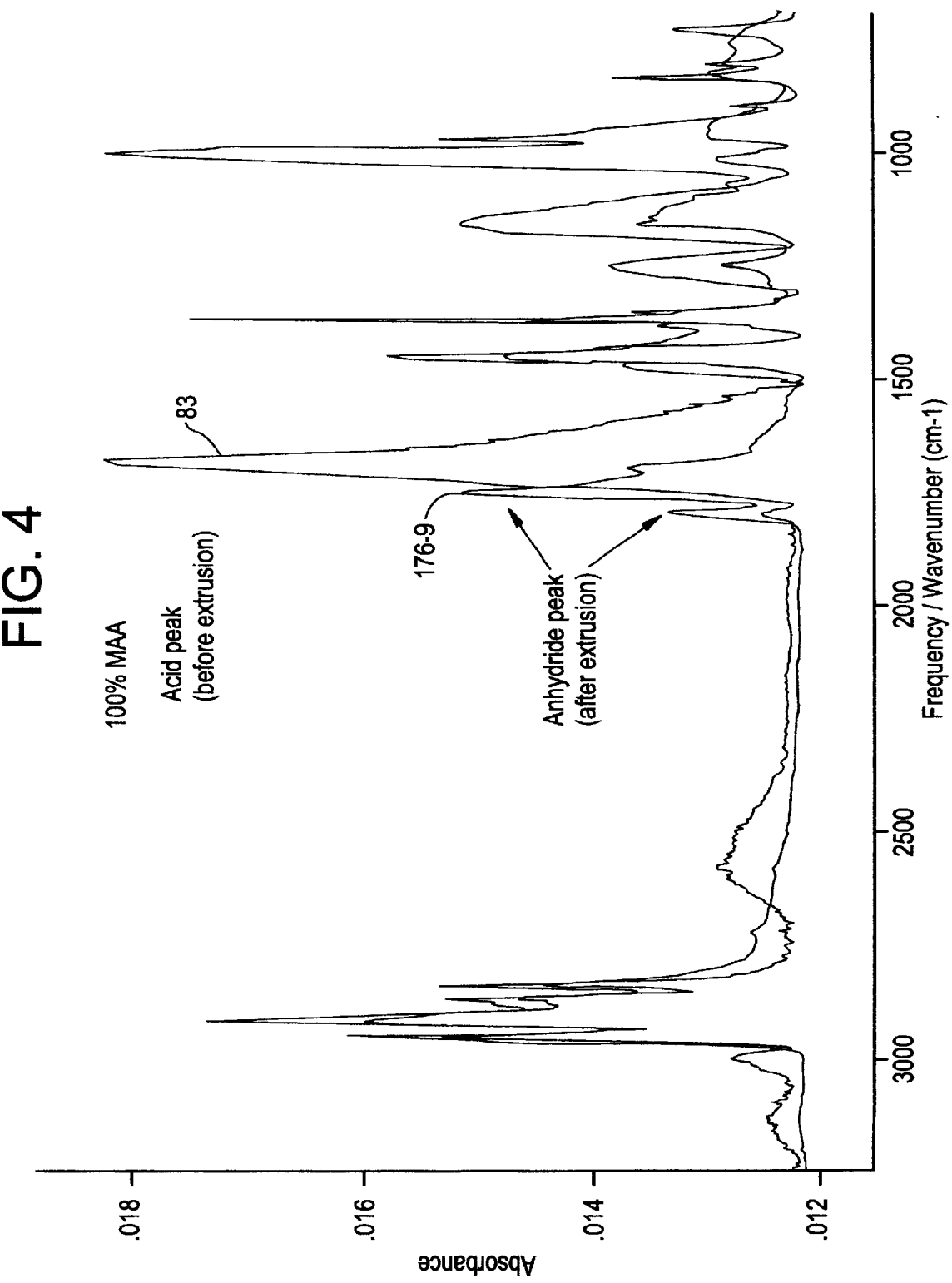
FIG. 4 shows the IR spectra before and after extrusion of a graft copolymer comprising a propylene homopolymer backbone to which was grafted poly(methacrylic acid).

The second step in the process of this invention is heating the graft copolymer produced in the first step to a temperature of about 170° C. to about 300° C. to dehydrate the acid groups in the graft copolymer to form anhydride groups. The heating can take place, for example, in a reaction vessel or in an extruder such as a twin screw extruder. Dehydration and formation of anhydride groups are indicated by thermogravimetric analysis (TGA) weight loss, moisture analysis, and functional group analysis by IR (see FIGS. 1–4). The extent of dehydration is directly proportional to the acid content in the graft copolymer. As shown by TGA, graft copolymers containing polymethacrylic acid as the polymerized monomer undergo almost complete dehydration to yield side chains containing anhydride groups and methacrylic acid groups grafted onto the propylene polymer material backbone. The anhydride groups are predominantly glutaric anhydride groups, but small amounts of succinic anhydride groups can also be present.

If acrylic acid rather than a 1–3 C alkyl-substituted acrylic acid is used as the acrylic monomer, the graft copolymer is difficult to extrude, exhibits poor strand quality, and has poor physical properties.

Graft copolymers containing equal to or greater than 60 mole % of 1–3 C alkyl-substituted acrylic acid groups that are subsequently dehydrated to form anhydride groups can be extruded to produce products with a good balance of properties such as notched Izod impact strength, elongation to break, and weldline strength.

Compositions containing the anhydride-group containing graft copolymers of this invention can easily be impact modified by the addition of a rubber component selected from one or more of the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) or (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin copolymer rubbers such as ethylene/propylene/diene monomer rubbers (EPDM). The preferred olefin copolymer rubbers are ethylene/propylene, ethylene/butene-1, and ethylene/octene-1 copolymers.

The monoalkenyl aromatic hydrocarbon-conjugated diene block copolymer can be a thermoplastic elastomer of the A-B (or diblock) structure, the linear A-B-A (or triblock) structure, the radial (A-B)n type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and ratio of monoalkenyl aromatic hydrocarbon to rubber. The block copolymer can also be hydrogenated. Typical monoalkenyl aromatic hydrocarbon monomers are styrene, ring-substituted $C_1$–$C_4$ linear or branched alkyl styrenes, and vinyltoluene. Styrene is preferred. Suitable conjugated dienes include, for example, butadiene and isoprene. Preferred block copolymers are hydrogenated styrene/ethylene-butene/styrene triblock copolymers.

The weight average molecular weight $M_w$ of the block copolymers generally will be in the range of about 45,000 to about 260,000 g/mole, average molecular weights in the range of about 50,000 to about 125,000 g/mole being preferred on the basis that they afford blend compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of crosslinked rubber phase surrounded by a compatibilizing shell, normally a glassy polymer or copolymer. The core is typically a diene rubber such as butadiene or isoprene, or an acrylate. The shell is typically a polymer of two or more monomers selected from styrene, methyl methacrylate, and acrylonitrile. Particularly preferred core-shell rubbers have an acrylate core.

Suitable impact modifiers include, for example, Engage 8100, 8150, and 8200 ethylene/octene-1 copolymers, commercially available from DuPont Dow Elastomers; EPM 306P random ethylene/propylene copolymer, commercially available from Miles Inc., Polysar Rubber Div.; Kraton G 1652 styrene/ethylene-butene/styrene triblock copolymer, commercially available from Shell Chemical Company; Exact ethylene/butene-1 copolymers, commercially available from Exxon Chemical Company, and KS080 and KS350 heterophasic polyolefins, commercially available from Montell USA Inc.

The impact modifier, if present, is used in an amount of about 2% to about 30%, preferably about 5% to about 15%, by weight, based on the total weight of the composition.

The composition can also contain a broad molecular weight distribution ($M_w/M_n$) propylene polymer material (BMWD PP). The BMPD PP has a $M_w/M_n$ of about 5 to about 60, preferably about 5 to about 40; a melt flow rate of about 0.5 to about 50, preferably about I to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst coming from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which preparation is incorporated herein by reference.

Other additives such as fillers and reinforcing agents, e.g., carbon black and glass fibers, as well as inorganic powders such as calcium carbonate, talc, and mica; pigments; slip agents; waxes; oils; antiblocking agents, and antioxidants can also be present.

When glass fibers are used as a reinforcing agent, they are used in an amount of about 2.5% to about 40%, preferably about 20% to about 40%, based on the total weight of the composition. A compatibilizing agent such as maleic anhydride-modified polypropylene is generally used with the glass fibers. Polypropylenes modified with various amounts of maleic anhydride are available commercially, for example, from Eastman Chemical Co. and Aristech Chemicals. The compatibilizing agent is used in an amount of about 0.5% to about 5%, preferably about 1% to about 3.0%, based on the total weight of the composition.

The test methods used to evaluate the molded specimens were:

| | |
|---|---|
| Izod impact | ASTM D-256A |
| Tensile strength | ASTM D-638-89 |
| Flexural modulus | ASTM D-790-86 |
| Flexural strength | ASTM D-790-86 |
| Elongation at break | ASTM D-638-89 |
| Weldline strength | ASTM D-638-89 |
| Weldline strength retention | Determined by dividing the weldline strength by the tensile strength and multiplying by 100 |
| Elongation at yield | ASTM D-638-89 |
| Elongation at break @ weldline | ASTM D-638-89 |
| Heat distortion temperature | ASTM D-648 |
| Melt flow rate, 230° C., 3.8 kg | ASTM 1238 |

The porosity of the propylene homopolymer used as the backbone polymer in the manufacture of the graft copolymers in the examples is measured as described in Winslow, N. M. and Shapiro, J. J., "An Instrument for the Measurement of Pore-Size Distribution by Mercury Penetration," ASTM Bull., TP 49, 39–44 (February 1959), and Rootare, H. M., "A Review of Mercury Porosimetry," 225–252 (In Hirshhom, J. S. and Roll, K. H., Eds., *Advanced Experimental Techniques in Powder Metallurgy*. Plenum Press, New York, 1970).

In this specification, all parts and percentages are by weight unless otherwise noted.

EXAMPLE 1

This example describes the effect of anhydride formation on the mechanical and thermal properties of neat and impact-modified formulations containing a graft copolymer comprising a propylene homopolymer backbone, to which was grafted a styrene/methacrylic acid copolymer (S/MAA), 4-t-butylstyrene/MAA copolymer, α-methylstyrene/MAA copolymer, or polymethacrylic acid (MAA). The monomer molar ratio or weight ratio for each sample is given in Table 1.

In this and the following examples the propylene homopolymer used as the backbone polymer had the following properties: spherical form, melt flow rate (MFR) of 9 g/10 min, a porosity of 0.45 cm$^3$/g and a $M_w$ of 170,000.

The monomers were grafted onto the polypropylene backbone at a grafting temperature of 100° C. using the previously described peroxide-initiated graft polymerization process. Ninety-five parts by weight of monomers were added per 100 parts of polypropylene. Lupersol PMS 50% t-butyl peroxy-2-ethyl hexanoate in mineral spirits, commercially available from Elf Atochem, was used as the peroxide initiator. The monomers were fed at 1 pph/min. A monomer to initiator molar ratio of 100 was used. The reaction conditions were maintained at 100° C. for 30 minutes after completion of monomer and peroxide addition, and the temperature was then raised to 140° C. for 1.5–2.0 hours under a nitrogen purge. The % conversion of monomer to polymer was 98.4–99.7% when a mixture of styrene and methacrylic acid monomers was used, and 96% when 100% methacrylic acid was used as the monomer.

The graft copolymer was then blended with a broad molecular weight distribution polypropylene (BMWD PP) having a polydispersity index of 7.4, a MFR of 1 g/10 min, and xylene solubles at room temperature of 1.5%, commercially available from Montell USA Inc. The amount of BMWD PP used for each sample is given in Table 1. Enough BMWD PP was added to adjust the effective add level to 50 pph of polymerized monomer(s) per hundred parts of polypropylene. The additional polypropylene makes the composition easier to process by reducing the amount of moisture given off during dehydration of the acid groups to form anhydride groups. Two different formulations, with and without Engage 8100 ethylene/octene-1 copolymer having a MFR of 1.0 g/10 min as an impact modifier, were compounded for property evaluations.

The samples were compounded on a 34 mm co-rotating, intermeshing Leistritz LSM twin screw extruder. Each sample was extruded as pellets at a barrel temperature of 230° C., a screw speed of 300 rpm, and a throughput rate of 25 lb/hr. A good vacuum and exhaust system were essential because of the gassing and popping experienced in formulations having an acid content of greater than 80 mole %.

The stabilizer package used was calcium stearate, Irganox 1010 tetrakis[methylene(3,5-di-t-butyl-4-hydroxyhydrocinnamate)]methane antioxidant, commercially available from CIBA Specialty Chemicals Corporation, and P-EPQ stabilizer, the main component of which is tetrakis(2,4-di-tert-butylphenyl)-4,4'-biphenylene diphosphonite, commercially available from CIBA Specialty Chemicals Corporation.

Compounded samples were dried at 80° C. for at least 4 hours prior to molding to remove surface moisture. One inch×⅛" test bars were used for all of the physical property measurements. Heat distortion temperature (HDT) measurements used ¼" flex bars unless otherwise noted. Test bars were produced on a 5 oz Battenfeld injection molding machine at a barrel temperature of 490° F. and a mold temperature of 150° F.

The results of the property evaluations for each formulation are given in Table 1.

graft copolymer comprising a propylene homopolymer backbone, to which was grafted a styrene/methacrylic acid copolymer (SMAA) or polymethacrylic acid (MMA). The styrene/methacrylic acid monomer molar ratio for each sample is given in Table 2.

The graft copolymers and their preparation were the same as those described in Example 1. The graft copolymers were blended with enough of the BMWD PP used in Example 1

TABLE 1

| Sample | Comp. 1(a) | Comp. 2(a) | 3(a) | 4(a) | 5(a) | 6(a) | 7(a) | Comp. 1(b) | Comp. 2(b) | 3(b) | 4(b) | 5(b) | 6(b) | 7(b) |
|---|---|---|---|---|---|---|---|---|---|---|---|---|---|---|
| S/MAA (molar ratio) | 80/20 | 60/40 | 40/60 | 20/80 | 0/100 | | | 80/20 | 60/40 | 40/60 | 20/80 | 0/100 | | |
| 4-t-Butyl-styrene/MAA (wt. ratio) | | | | | | 20/80 | | | | | | | 20/80 | |
| α-Methyl-styrene/MAA (wt. ratio) | | | | | | | 20/80 | | | | | | | 20/80 |
| Graft copolymer (wt. %) | 68.2 | 68.2 | 68.2 | 68.2 | 68.2 | 68.2 | 68.2 | 61.38 | 61.38 | 61.38 | 61.38 | 61.38 | 61.32 | 64.92 |
| BWMD PP (wt. %) | 31.5 | 31.5 | 31.5 | 31.5 | 31.5 | 31.3 | 31.3 | 28.35 | 28.35 | 28.35 | 28.35 | 28.35 | 28.23 | 24.62 |
| Ca stearate (wt. %) | 0.1 | 0.1 | 0.1 | 0.1 | 0.1 | 0.1 | 0.1 | 0.1 | 0.1 | 0.1 | 0.1 | 0.1 | 0.1 | 0.1 |
| Antioxidant (wt. %) | 0.05 | 0.05 | 0.05 | 0.05 | 0.05 | 0.4 | 0.4 | 0.05 | 0.05 | 0.05 | 0.05 | 0.05 | 0.4 | 0.4 |
| P-EPQ stabilizer (wt. %) | 0.15 | 0.15 | 0.15 | 0.15 | 0.15 | | | 0.15 | 0.15 | 0.15 | 0.15 | 0.15 | | |
| Impact modifier (wt. %) | 0 | 0 | 0 | 0 | 0 | 0 | 0 | 9.97 | 9.97 | 9.97 | 9.97 | 9.97 | 9.95 | 9.95 |
| Notched Izod impact strength (ft.lb/in) | 0.36 | 0.39 | 0.45 | 0.63 | 0.6 | 0.49 | 0.7 | 0.84 | 0.57 | 0.96 | 1.47 | 1.68 | 1.41 | 1.73 |
| Tensile strength (psi) | 5470 | 6060 | 5670 | 5730 | 5690 | 5732 | 5658 | 4390 | 5110 | 4540 | 4420 | 4270 | 4394 | 4411 |
| Elongation to yield (%) | 3 | 3.9 | 3.7 | 3.8 | 4.8 | 4.2 | 4.4 | 3.9 | 4.4 | 4.3 | 4.3 | 4.1 | 4.3 | 4.5 |
| Elongation to break (%) | 6.6 | 4.2 | 7.4 | 7.7 | 15 | 8.2 | 13 | 23 | 6.7 | 47 | 49 | 77 | 44.5 | 63.6 |
| Weldline strength (psi) | 2340 | 2180 | 1870 | 4980 | 5670 | 5569 | 5490 | 2310 | 2190 | 2120 | 3960 | 4220 | 4096 | 4077 |
| Retained strength (%) | 43 | 36 | 33 | 87 | 99 | 97.2 | 97 | 53 | 43 | 47 | 90 | 99 | 93.2 | 92.4 |
| Flexural modulus @ 0.5"/min (kpsi) | 369 | 392 | 386 | 392 | 359 | 336.6 | 333.6 | 286 | 316 | 302 | 298 | 276 | 261.8 | 262 |
| Flexural strength @ 0.5"/min (psi) | 10020 | 11000 | 10370 | 10510 | 10530 | 9815 | 9576 | 7880 | 9010 | 8050 | 7920 | 7900 | 7538 | 7431 |
| HDT @ 66 psi (1/4" bar) (° C.) | 119 | 132 | 137 | 128 | 133 | 129 | 128 | 109 | 129 | 127 | 122.6 | 125 | 117 | 115 |
| HDT @ 264 psi (1/4" bar) (° C.) | 90.3 | 103 | 91.5 | 89.6 | 84 | 77.9 | 77.6 | 85 | 91.6 | 79.2 | 76.5 | 67.4 | 69 | 67.4 |
| MFR (230° C., 3.8 kg) | 12 | 8.2 | 6.2 | 4.5 | 5.2 | 6 | 5.2 | 12 | 8.8 | 7.3 | 4.9 | 7.4 | 5 | 5.2 |

The data show that products made from compositions containing a significant amount of anhydride groups (Samples 3(a), 4(a), 3(b), 4(b), 5(a), 5(b), 6(a), 6(b), 7(a), and 7(b)) had a better balance of properties such as notched Izod impact strength, elongation to break, weldline strength, and heat distortion temperatures, compared to Comparative Samples 1(a), 2(a), 1(b3, and 2(b) made with less than 60 mole % of methacrylic acid.

EXAMPLE 2

This example describes the effect of anhydride formation on the mechanical and thermal properties of neat and impact-modified glass-reinforced formulations containing a to adjust the effective add level to 50 parts of polymerized monomer(s) per hundred parts of polypropylene. Two different formulations, with and without a heterophasic polyolefin as an impact modifier, were compounded for property evaluations. Sufficient heterophasic polyolefin was added so that the effective rubber content of the composition was 15% by weight.

The samples were compounded on a 40 mm co-rotating, intermeshing twin screw Werner & Pfleiderer ZSK extruder. Each sample was extruded as pellets at a barrel temperature of 250° C., a screw speed of 450 rpm, and a throughput rate of 200 lb/hr.

The stabilizer package used was 0.1% calcium stearate and 0.2% Irganox B-225 antioxidant, a blend of I part Irganox 1010 tetrakis[methylene(3,5-di-tert-butyl-4-hydroxyhydrocinnamate)]methane stabilizer and 1 part Irgafos 168 tris(2,4-di-t-butylphenyl) phosphite, commercially available from CIBA Specialty Chemicals Corporation.

3790 Glass fibers, 13 μm in diameter and sized with an aminosilane sizing agent, were added in an amount of 29.5 wt. %. The glass fibers are commercially available from PPG Industries Inc. A maleic anhydride-grafted polypropylene having a maleic anhydride content of 1.4 % was added as a compatibilizer in an amount of 1.37 wt. %.

In Table 2, the impact modifier was a heterophasic polyolefin containing (i) 35% of a propylene homopolymer having an isotactic index, defined as the xylene insoluble fraction, of 97.5, (ii) 6.9% of a semi-crystalline ethylene-propylene copolymer that is xylene insoluble at room temperature, and (iii) 58.1% of an amorphous ethylene-propylene copolymer rubber that is xylene soluble at room temperature.

The compounded samples were dried and molded into test bars as described in Example 1. The results of the property evaluations for each formulation are given in Table 2.

mixed with a graft copolymer containing anhydride groups, made from a graft copolymer comprising a propylene homopolymer backbone, onto which methacrylic acid was graft-polymerized.

The graft copolymer and its preparation are described in Example 1. The graft copolymer was blended with the same BMWD PP as described in Example 1. Enough BMWD PP was added to adjust the effective add level to 50 parts of polymerized monomer per hundred parts of polypropylene.

Samples containing various impact modifiers were compounded for property evaluations as described in Example 1. The amount of each impact modifier added is shown in Table 3. The stabilizer package used was 0.1% calcium stearate and 0.4% Irganox B-225 antioxidant. The samples were dried and test bars were produced as described in Example 1. The results of the property evaluations for each formulation are given in Table 3.

In Table 3, Engage 8200 is an ethylene/octene-1 copolymer having a MFR of 5.0 g/10 min (190° C., 2.16 kg) and

TABLE 2

| Sample | Comp. 1(a) | Comp. 2(a) | 3(a) | 4(a) | 5(a) | Comp. 1(b) | Comp. 2(b) | 3(b) | 4(b) | 5(b) |
|---|---|---|---|---|---|---|---|---|---|---|
| S/MAA (molar ratio) | 80/20 | 60/40 | 40/60 | 20/80 | 0/100 | 80/20 | 60/40 | 40/60 | 20/80 | 0/100 |
| Graft copolymer (wt. %) | 47.2 | 47.2 | 47.2 | 47.2 | 47.2 | 37.1 | 37.1 | 37.1 | 37.1 | 37.1 |
| BMWD PP (wt. %) | 21.63 | 21.63 | 21.63 | 21.63 | 21.63 | 9.26 | 9.26 | 9.26 | 9.26 | 9.26 |
| Glass fibers (wt. %) | 29.5 | 29.5 | 29.5 | 29.5 | 29.5 | 29.5 | 29.5 | 29.5 | 29.5 | 29.5 |
| Compatibilizer (wt. %) | 1.37 | 1.37 | 1.37 | 1.37 | 1.37 | 1.37 | 1.37 | 1.37 | 1.37 | 1.37 |
| Ca stearate (wt. %) | 0.1 | 0.1 | 0.1 | 0.1 | 0.1 | 0.1 | 0.1 | 0.1 | 0.1 | 0.1 |
| Antioxidant (wt. %) | 0.2 | 0.2 | 0.2 | 0.2 | 0.2 | 0.2 | 0.2 | 0.2 | 0.2 | 0.2 |
| Impact modifier (wt. %) | 0 | 0 | 0 | 0 | 0 | 22.17 | 22.17 | 22.17 | 22.17 | 22.17 |
| Izod impact (ft.lb/in) | 0.81 | 0.825 | 0.88 | 1.32 | 1.43 | 0.93 | 0.848 | 1.28 | 2.4 | 3.3 |
| Tensile strength (psi) | 10600 | 8440 | 11600 | 12180 | 15300 | 7180 | 7600 | 8450 | 10200 | 10100 |
| Elongation to break (%) | 1.2 | 1.3 | 1.5 | 2.3 | 3.1 | 1.2 | 1.3 | 1.9 | 3.3 | 6.1 |
| Weldline strength (psi) | 3850 | 3620 | 4310 | 4600 | 5840 | 3010 | 2980 | 3250 | 3350 | 3480 |
| Elongation to break @ weldline (%) | 2.3 | 2.2 | 2.5 | 2.8 | 3.1 | 2.4 | 2.25 | 2.6 | 2.8 | 3.4 |
| Retained strength (%) | 36.3 | 43 | 37.2 | 37.8 | 38.2 | 42 | 39.2 | 38.4 | 32.8 | 34.5 |
| Flexural modulus @ 0.5"/min (kpsi) | 1071 | 1006.1 | 1041.5 | 971.7 | 1063.7 | 741 | 788.7 | 727.2 | 744.7 | 686.1 |
| Flexural strength @ 0.5"/min (psi) | 16090 | 15870 | 17440 | 19260 | 24840 | 10610 | 11410 | 12340 | 15630 | 16240 |
| H.D.T. @ 66 psi (1/8" bar) (° C.) | 156 | 158 | 160 | 160 | 162 | 148.8 | 155 | 157 | 157 | 157 |
| H.D.T. @ 264 psi (1/8" bar) (° C.) | 137 | 131 | 146 | 145 | 150 | 129 | 138 | 138 | 137 | 138 |
| MRF (230° C., 3.8 kg) | 5.2 | 2.5 | 1.2 | 1 | 1.5 | 5.6 | 2.4 | 1.2 | 1.3 | 2 |

The data in Table 2 show that the formulations, both with and without an impact modifier, were brittle and had low notched Izod impact strength when there was little or no anhydride formation (Comparative Samples 1(a), 2(a), 1(b) and 2(b)). The overall impact/stiffness/heat balance was better in formulations having a significant anhydride concentration in neat as well as impact-modified formulations.

EXAMPLE 3

This example shows the effect on physical and thermal properties of various kinds of impact modifiers that are is commercially available from DuPont-Dow Elastomers. EPR 306P is a random ethylene/propylene copolymer having an ethylene content of 57%, and is commercially available from Polysar Rubbber Division of Miles, Incorporated. Engage 8150 ethylene/octene-1 copolymer contains 25% octene-1, has a MFR of 0.5 g/10 min, and is commercially available from DuPont-Dow Elastomers. Kraton G 1652 is a styrene/ethylene-butene/styrene triblock copolymer containing 29% styrene and 71% ethylene/butene rubber midblock and is commercially available from Shell Chemical Company. The heterophasic polyolefin is the same as in Example 2.

TABLE 3

| Sample | 1 | 2 | 3 | 4 | 5 |
|---|---|---|---|---|---|
| Graft copolymer (wt. %) | 62.68 | 62.68 | 62.68 | 62.68 | 62.68 |
| BMWD PP (wt. %) | 26.87 | 26.87 | 26.87 | 21.5 | 26.87 |
| Engage 8200 copolymer (wt. %) | 9.95 | | | | |
| EPR 306P rubber (wt. %) | | 9.95 | | | |

TABLE 3-continued

| Sample | 1 | 2 | 3 | 4 | 5 |
|---|---|---|---|---|---|
| Engage 8150 copolymer (wt. %) | | | 9.95 | | |
| Heterophasic polyolefin (wt. %) | | | | 15.32 | |
| Kraton G 1652 rubber (wt. %) | | | | | 9.95 |
| Ca stearate (wt. %) | 0.1 | 0.1 | 0.1 | 0.1 | 0.1 |
| Antioxidant (wt. %) | 0.4 | 0.4 | 0.4 | 0.4 | 0.4 |
| Izod impact (ft.lb/in) | 1.4 | 1.241 | 1.584 | 1.406 | 1.372 |
| Mode of break | Complete | Complete | Complete | Complete | Complete |
| Tensile strength (kpsi) | 4.29 | 4.35 | 4.33 | 4.52 | 4.53 |
| Elongation to yield (%) | 3.88 | 4.09 | 4.1 | 4.92 | 4.28 |
| Elongation to break w/extensometer (%) | 54.81 | 60.72 | 83.14 | 95.37 | 90.71 |
| Weldline strength (kpsi) | 4.24 | 4.13 | 4.12 | 4.31 | 4.29 |
| Elongation to break @ weldline (%) | 3.86 | 3.09 | 3.15 | 3.93 | 3.93 |
| Retained strength (%) | 98.8 | 94.9 | 95 | 95.3 | 94.7 |
| Flexural modulus @ 0.5"/min (kpsi) | 262.93 | 274.26 | 272.6 | 259.7 | 272.19 |
| Flexural strength @ 0.5"/min (psi) | 7.58 | 7.74 | 7.85 | 7.86 | 8.06 |
| H.D.T. @ 66 psi (1/4" bar)(° C.) | 124 | 128 | 128 | 125 | 125 |
| H.D.T. @ 264 psi (1/4" bar)(° C.) | 66.2 | 68.9 | 70 | 68.1 | 71.6 |
| MFR (3800 g @ 230° C.) | 5 | 3.2 | 3.2 | 4.6 | 4 |

The data show that compositions having good physical and thermal properties can be obtained with a wide variety of impact modifiers.

EXAMPLE 4

This example describes the effect of anhydride formation on the mechanical and thermal properties of neat and impact-modified formulations containing a graft copolymer comprising a propylene homopolymer backbone, to which was graft-polymerized a methyl methacrylate/methacrylic acid copolymer. The monomer molar ratio for each sample is given in Table 4.

The graft copolymers were prepared as described in Example 1. The graft copolymers were blended with enough of the BMWD PP used in Example 1 to adjust the effective add level to 50 parts of polymerized monomers per hundred parts of polypropylene. Two different formulations, with and without 9.95% by weight of Engage 8150 ethylene/octene-1 copolymer as an impact modifier, were compounded for property evaluations.

The samples were compounded as described in Example 1. The stabilizer package used was 0.1% calcium stearate and 0.4% Irganox B-225 antioxidant. The compounded samples were dried and molded into test bars as described in Example 1. The results of the property evaluations for each formulation are given in Table 4.

Although dehydration to form anhydride groups occurs (see FIG. 1), the effect of anhydride formation on polymer properties is not as obvious because poly(methyl methacrylate) itself is very ductile. In contrast, polymers of styrene and substituted styrenes are very brittle, and the effect of anhydride formation on polymer properties is more pronounced.

TABLE 4

| Sample | 1(a) | 2(a) | 3(a) | 1(b) | 2(b) | 3(b) |
|---|---|---|---|---|---|---|
| MMA/MAA (molar ratio) (%) | 60/40 | 40/60 | 20/80 | 60/40 | 40/60 | 20/80 |
| Graft copolymer (wt. %) | 68.16 | 68.16 | 68.16 | 61.32 | 61.32 | 61.32 |
| BMWD PP (wt. %) | 31.34 | 31.34 | 31.34 | 28.23 | 28.23 | 28.23 |
| Impact modifier (wt. %) | 0 | 0 | 0 | 9.95 | 9.95 | 9.95 |
| Calcium stearate (%) | 0.1 | 0.1 | 0.1 | 0.1 | 0.1 | 0.1 |
| Antioxidant (%) | 0.4 | 0.4 | 0.4 | 0.4 | 0.4 | 0.4 |
| Notched Izod impact (ft.lb/in) | 0.55 | 0.55 | 0.48 | 1.61 | 1.6 | 1.69 |
| Tensile strength (psi) | 5661 | 5793 | 5873 | 4393 | 4351 | 4402 |
| Elongation to yield (%) | 4 | 4.1 | 4.4 | 4.2 | 4.1 | 4.1 |
| Elongation to break w/extensometer (%) | 11.7 | 9.7 | 8.8 | 49.2 | 52.6 | 51.8 |
| Weldline strength (psi) | 5380 | 5588 | 5569 | 4213 | 4110 | 4212 |
| Elongation to break @ weldline (%) | 7.2 | 7.8 | 7.5 | 7.4 | 7.3 | 7.8 |
| Retained strength (%) | 95 | 96.5 | 94.8 | 95.9 | 94.5 | 95.7 |
| Flexural modulus @ 0.5"/min (kpsi) | 343 | 347.4 | 348.7 | 260 | 268.9 | 263.6 |
| Flexural strength @ 0.5"/min (psi) | 9863 | 10020 | 10050 | 7430 | 7374 | 7518 |
| H.D.T. @ 66 psi (1/4" bar) (° C.) | 119 | 121 | 126 | 114 | 117 | 116 |
| H.D.T. @ 264 psi (1/4" bar) (° C.) | 80.8 | 82.1 | 83.5 | 69.9 | 70.8 | 70.9 |
| MFR (3800 g @ 230° C.) | 8.8 | 6.4 | 4.8 | 9.2 | 5.8 | 4.6 |

EXAMPLE 5

This example shows the % dehydration achieved for various comonomers of methacrylic acid, i.e., methyl methacrylate (MMA), styrene (S), α-methyl styrene, and 4-t-butylstyrene, and for different amounts of comonomer. The reaction does not go to completion, therefore the % dehydration of acid groups to form anhydride groups depends upon which comonomer is present and the ratio of comonomer to methacrylic acid. The molar ratio or weight ratio of monomers for each sample is given in Table 5.

The graft copolymers were prepared as described in Example 1.

TABLE 6

| Sample | Comp. 1(a) | Comp. 1(b) | Comp. 2(a) | Comp. 2(b) | Comp. 3 (A) | Comp. 3 (b) |
|---|---|---|---|---|---|---|
| AA/MAA (wt. ratio) | 50/50 | 50/50 | 100/0 | 100/0 | | |
| AA/MMA (wt. ratio) | | | | | 50/50 | 50/50 |
| Graft copolymer (wt. %) | 68.2 | 61.4 | 68.2 | 61.4 | 68.2 | 61.4 |
| BMWD PP (wt. %) | 31.5 | 28.33 | 31.5 | 28.33 | 31.5 | 28.33 |
| Ca stearate (wt. %) | 0.1 | 0.1 | 0.1 | 0.1 | 0.1 | 0.1 |
| Antioxidant (wt. %) | 0.05 | 0.05 | 0.05 | 0.05 | 0.05 | 0.05 |
| P-EPQ stabilizer (wt. %) | 0.15 | 0.15 | 0.15 | 0.15 | 0.15 | 0.15 |
| Impact modifier (wt. %) | 0 | 9.97 | 0 | 9.97 | 0 | 9.97 |
| | Brittle, Could Not Be Extruded | | | | | |
| Notched Izod impact strength (ft.lb/in) | | | | | 0.4 | 0.8 |
| Tensile strength (psi) | | | | | 5867 | 4291 |
| Elongation to yield (%) | | | | | 4 | 3.5 |
| Elongation to break (%) | | | | | 4.5 | 15.3 |
| Weldline strength (psi) | | | | | 5787 | 4229 |
| Retained strength (%) | | | | | 98.6 | 98.5 |
| Flexural modulus @ 0.5"/min (kpsi) | | | | | 339.3 | 272.7 |
| Flexural strength @ 0.5"/min (psi) | | | | | 10180 | 7633 |

The actual weight loss divided by the calculated weight loss due to dehydration=% dehydration achieved. A Serodyn Aquatest 10 Karl Fischer coulometric moisture analyzer was used to determine the actual weight loss.

It appears that an improvement in properties occurs at about 50% dehydration. Therefore in order to achieve greater than 50% dehydration, a 50/50 molar ratio must be used for styrene/methacrylic acid and a molar ratio of 60/40 for methyl methacrylate/methacrylic acid, for example.

TABLE 5

| Monomer Composition | Calculated Wt. Loss Due to Dehydration (%) | Actual Wt. Loss Due to Dehydration (%) | Dehydration Achieved (%) |
|---|---|---|---|
| MMA/MAA (80/20 mole %) | 0.9 | 0.36 | 40 |
| MMA/MAA (60/40 mole %) | 1.83 | 1.08 | 59 |
| MMA/MAA (40/60 mole %) | 2.86 | 2.24 | 78.3 |
| MMA/MAA (20/80 mole %) | 3.89 | 3.1 | 79.7 |
| S/MAA (70/30 mole %) | 1.34 | 0.38 | 28.3 |
| S/MAA (60/40 mole %) | 1.81 | 0.86 | 47.5 |
| S/MAA (50/50 mole %) | 2.32 | 1.19 | 51.3 |
| S/MAA (40/60 mole %) | 2.84 | NA | NA |
| S/MAA (20/80 mole %) | 3.78 | 3.4 | 86.4 |
| 100% MAA | 4.98 | 4.94 | 99.35 |
| α-Methylstyrene/MAA (20/80 wt. 1%, 90%) | 3.854 | 3.6 | 93.4 |
| 4-t-Butylstyrene/MAA (20/80 wt. %, 95%) | 3.967 | 3.3 | 83.2 |

COMPARATIVE EXAMPLE 1

This example shows the effect of using acrylic acid rather than a 1–3 C alkyl-substituted acrylic acid as one of the polymerizable monomers in making graft copolymers of a propylene polymer material.

The graft copolymers were prepared as described in Example 1. Two formulations with and without 9.97 weight % Engage 8100 ethylene/octene-1 copolymer as an impact modifier were compounded for property evaluations as described in Example 1. The stabilizer package was the same as in Example 1. Extrusion was attempted under the same conditions as in Example 1. The results of the extrusion attempts and property measurements are shown in Table 6.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A process for producing graft copolymers containing anhydride groups consisting essentially of:
   (1) making a graft copolymer comprising a backbone of a propylene polymer material having graft polymerized thereto polymerized monomers selected from the group consisting of
      (a) at least one 1–3 C alkyl-substituted acrylic acid, and
      (b) a mixture of (a) with at least one vinyl monomer capable of copolymerizing therewith,
   wherein the total amount of polymerized monomers is about 20 parts to about 240 parts per hundred parts of the propylene polymer material and the amount of substituted acrylic acid is equal to or greater than 60 mole % of the polymerized monomers, and
   (2) heating the resulting graft copolymer to a temperature of about 170° C. to about 300° C. to dehydrate the acid groups in the graft copolymer to form anhydride groups.

2. The process of claim 1, wherein the vinyl monomer is selected from the group consisting of:
   (a) vinyl-substituted aromatic, heterocyclic, and alicyclic compounds,
   (b) vinyl esters of aromatic carboxylic acids,
   (c) vinyl esters of saturated aliphatic carboxylic acids,
   (d) unsaturated aliphatic nitriles,
   (e) unsaturated aliphatic amides, and
   (f) esters of unsaturated aliphatic carboxylic acids.

3. The process of claim 1, wherein the monomer is methacrylic acid.

4. The process of claim 1, wherein the monomers are a mixture of methacrylic acid and styrene.

5. The process of claim 1, wherein the amount of substituted acrylic acid is greater than 80 mole % of the polymerized monomers.

6. The process of claim 1, wherein the propylene polymer material comprising the backbone of the graft copolymer is selected from the group consisting of:

(a) a crystalline homopolymer of propylene having an isotactic index greater than 80;

(b) a crystalline random copolymer of propylene and an olefin selected from the group consisting of ethylene and $C_4$—$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;

(c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;

(d) an olefin polymer composition comprising:
  (i) about 10% to about 60% by weight of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight and an isotactic index greater than 85;
  (ii) about 5% to about 25% by weight of a copolymer of ethylene and propylene or a $C_4$–$C_8$ α-olefin that is insoluble in xylene at ambient temperature, and
  (iii) about 30% to about 70% by weight of an elastomeric copolymer selected from the group consisting of (a) ethylene and propylene, (b) ethylene, propylene, and a $C_4$–$C_8$ α-olefin; and (c) ethylene and a $C_4$–$C_8$ α-olefin, the copolymer optionally containing about 0.5% to about 10% of a diene and containing less than 70% by weight of ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages and has a flexural modulus of less than 150 MPa; and (e) a thermoplastic olefin comprising:
  (i) about 10% to about 60% of a crystalline propylene homopolymer having an isotactic index greater than 80, or a crystalline propylene copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 85;
  (ii) about 20% to about 60% of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene and containing less than 70% ethylene and being soluble in xylene at ambient temperature; and
  (iii) about 3% to about 40% of a copolymer of ethylene and propylene or a $C_4$–$C_8$ α-olefin that is insoluble in xylene at ambient temperature, wherein the composition has a flexural modulus of greater than 150 but less than 1200 MPa.

7. The process of claim 6, wherein the propylene polymer material is a propylene homopolymer.

8. A graft copolymer made by the process of claim 1 comprising a backbone of a propylene polymer material and side chains comprising glutaric anhydride groups and methacrylic acid groups.

9. The graft copolymer of claim 8 wherein the side chains additionally comprise at least one polymerized vinyl monomer selected from the group consisting of:

(a) vinyl-substituted aromatic, heterocyclic, and alicyclic compounds, (b) vinyl esters of aromatic carboxylic acids, (c) vinyl esters of saturated aliphatic carboxylic acids, (d) unsaturated aliphatic nitriles, (e) unsaturated aliphatic amides, and (f) esters of unsaturated aliphatic carboxylic acids.

10. A graft copolymer consisting essentially of a backbone of a propylene polymer material and side chains consisting essentially of glutaric anhydride groups and methacrylic acid groups the graft copolymer being made by graft polymerizing monomers selected from the group consisting of:

(a) at least one 1–3 C alkyl-substituted acrylic acid, and (b) a mixture of (a) with at least one vinyl monomer capable of copolymerizing therewith, wherein the total amount of polymerized monomers is about 20 parts to about 240 parts per hundred parts of the propylene polymer material and the amount of substituted acrylic acid is equal to or greater than 60 mole % of the polymerized monomers, to the backbone of propylene polymer material and subsequently heating the graft copolymer to a temperature of about 170° C. to about 300° C. to dehydrate the acid groups in the graft copolymer to form anhydride groups.

11. The graft copolymer of claim 10 wherein the side chains additionally comprise at least one polymerized vinyl monomer selected from the group consisting of:

(a) vinyl-substituted aromatic, heterocyclic, and alicyclic compounds, (b) vinyl esters of aromatic carboxylic acids, (c) vinyl esters of saturated aliphatic carboxylic acids, (d) unsaturated aliphatic nitrites, (e) unsaturated aliphatic amides, and (f) esters of unsaturated aliphatic carboxylic acids.

* * * * *